Dec. 30, 1969    R. O. ROBISON    3,487,319
MOUNTING FOR BATTERIES IN AN ELECTRICALLY DRIVEN DEVICE
Original Filed Oct. 18, 1965    2 Sheets-Sheet 1
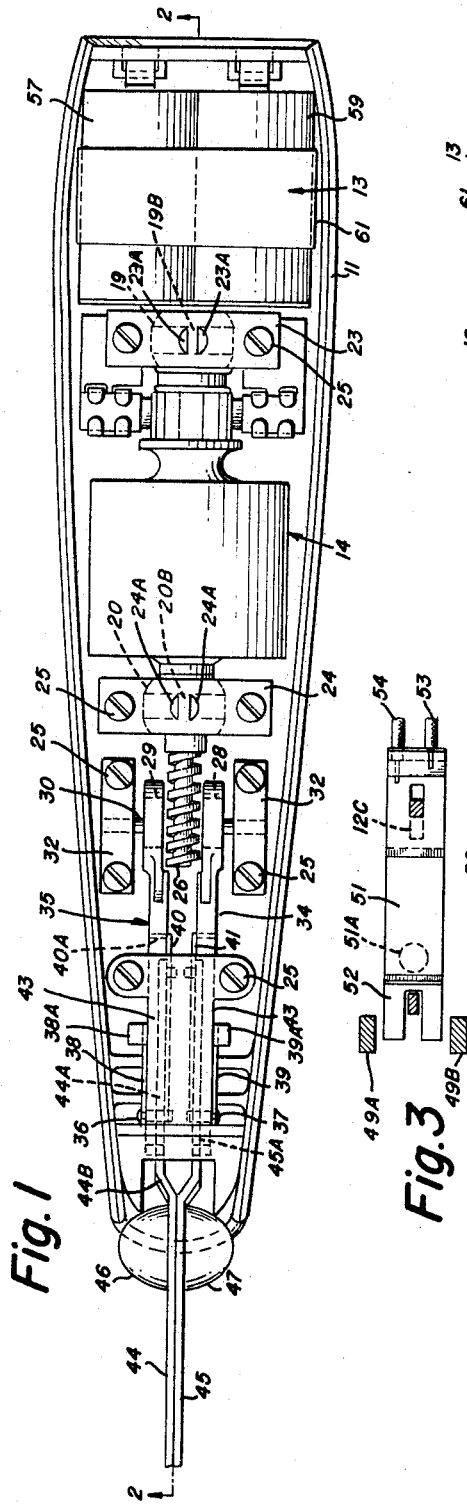
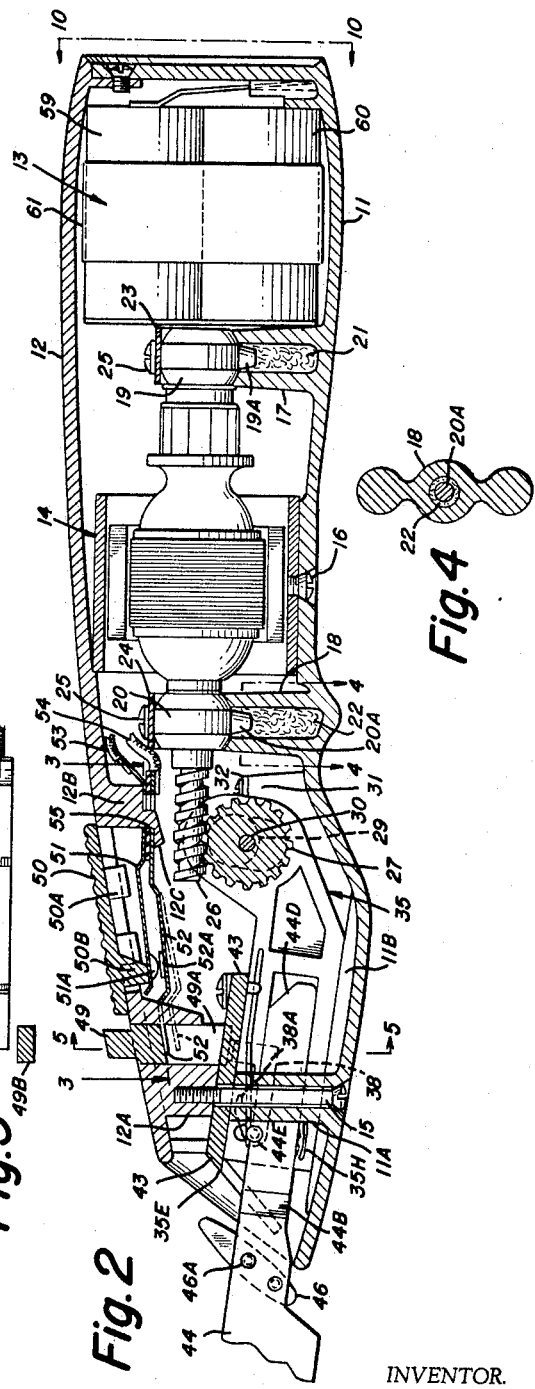
INVENTOR.
RUSSELL O. ROBISON
BY Dec. 30, 1969   R. O. ROBISON   3,487,319
MOUNTING FOR BATTERIES IN AN ELECTRICALLY DRIVEN DEVICE
Original Filed Oct. 18, 1965   2 Sheets-Sheet 2
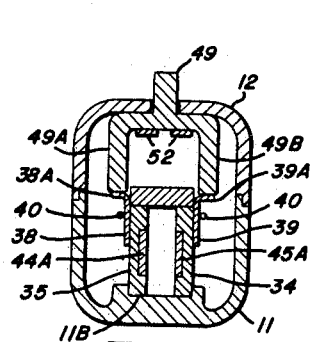
Fig. 5
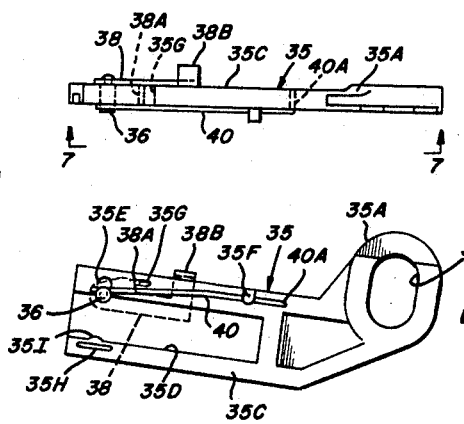
Fig. 6
Fig. 7
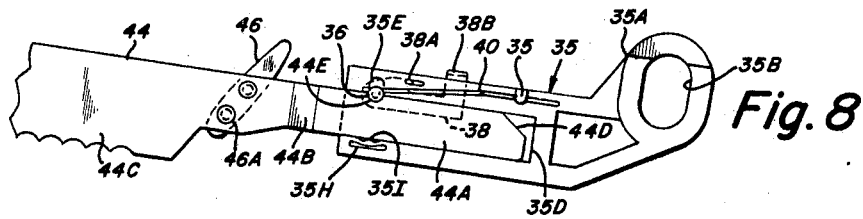
Fig. 8
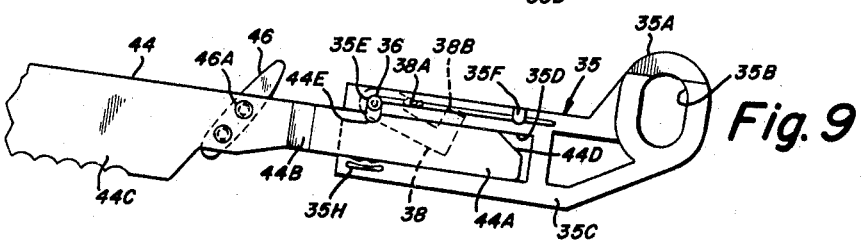
Fig. 9
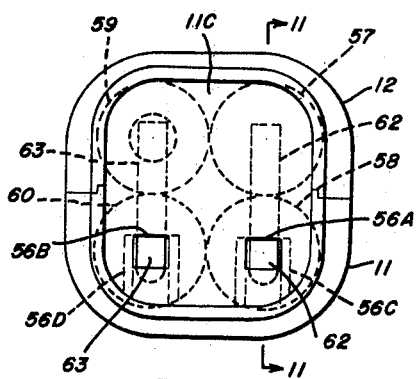
Fig. 10
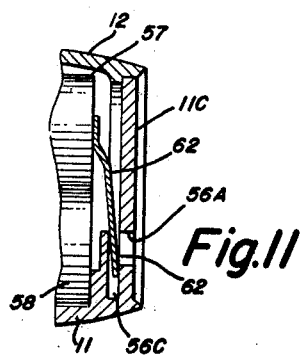
Fig. 11
INVENTOR.
RUSSELL O. ROBISON
BY United States Patent Office 3,487,319
Patented Dec. 30, 1969

3,487,319
MOUNTING FOR BATTERIES IN AN ELECTRICALLY DRIVEN DEVICE
Russell O. Robison, Plymouth, Ohio, assignor to Dominion Electric Corporation, a corporation of Ohio
Original application Oct. 18, 1965, Ser. No. 496,947. Divided and this application Apr. 6, 1967, Ser. No. 629,024
Int. Cl. H01n 45/04
U.S. Cl. 320—2
4 Claims

ABSTRACT OF THE DISCLOSURE

The assembly rechargeable batteries in the housing of an electrically driven device, such as an electric knife for example, are mounted and connected in such manner as to be readily connected for recharging through resilient metal strips secured to the ends of batteries in the assembly, which strips are accessible through openings in the housing for engagement with contact elements of a charging device and protected from protruding outwardly of the housing. The structure eliminates or minimizes wiring connections carried by the housing and the need for mounting the resilient metal strips to the housing itself and the required connection of such housing-mounted strips to the batteries.

RELATIONSHIP TO OTHER APPLICATIONS

This application is a division of application Ser. No. 496,947 filed by applicant on Oct. 18, 1965, now Patent No. 3,337,954 issued Aug. 29, 1967.

My invention relates to novel means for mounting to an assembly of rechargeable batteries in the housing of an electrically driven device, such as an electric knife, resilient metal strips adapted to engage contact elements of a recharging device.

The invention of this divisional application is shown in the environment of my improved driving unit for an electric knife, subject of said parent application Ser. No. 496,947, now Patent No. 3,337,954 issued Aug. 29, 1967.

An object of this invention is the provision of improved means for mounting resilient metal strips, utilized for engagement with contact elements of a recharging device, to an assembly of rechargeable batteries in an electrically driven device.

Another object is the provision of novel structure in the housing of a motor driven device providing access to the metal strips connected to rechargeable batteries within the housing and protecting the strips from extraneously imposed damage and against protruding outwardly of the housing.

Another object is the elimination or minimization of connections such as wire connections in a housing containing rechargeable batteries, and particularly wire connections between the batteries and the resilient metal strips which engage contact elements of a recharging device.

Another object is the provision for eliminating the need for connecting the resilient metal strips, used in recharging batteries in a housing, to the housing and then a connection between the housing and batteries.

Other objects and a fuller understanding of the invention may be had by referring to the following description and claims, taken in conjunction with the accompanying drawings, in which:

FIGURE 1 is a longitudinal sectional view in a horizontal plane of my improved driving unit with the upper shell portion removed to show the interior of the unit;

FIGURE 2 is a longitudinal sectional view of my driving unit taken in a vertical plane therethrough;

FIGURE 3 is a detailed sectional view taken through the line 3—3 of FIGURE 2;

FIGURE 4 is a cross-sectional view taken through the line 4—4 of FIGURE 2;

FIGURE 5 is a cross-sectional view taken through the line 5—5 of FIGURE 2;

FIGURE 6 is a plan view of one of the coupling elements used for coupling a knife blade to revolving round cam driven by the electric motor of the unit;

FIGURE 7 is a side view of the coupling element looking in the direction of the arrows 7—7 of FIGURE 6;

FIGURE 8 is a side view of the coupling element showing the shank of a knife blade mounted in position therein and with the blade locked in the socket of the coupling element;

FIGURE 9 is a view similar to that of FIGURE 8 but showing the position of the parts with the blade unlocked in the socket of the coupling element;

FIGURE 10 is an end view looking in the direction of the arrows 10—10 of FIGURE 2; and FIGURE 11 is a cross-sectional view taken through the line 11—11 of FIGURE 10.

My driving unit has a housing comprised of a lower shell 11 of suitable molded plastic material and an upper shell 12 of suitable molded plastic material which meets with the shell 11 to give a contoured smooth outer surface. Mounted in the housing near the rearward end thereof is a battery assembly 13. Forwardly of the battery assembly 13 in the housing is an electric motor denoted generally by the reference character 14, the motor being held in the housing by screws 16. The upper and lower shells are held together by the screw 15 interconnecting posts 11A of the lower shell and post 12A of the upper shell.

Integral with and extending upwardly from the shell 11 just forwardly of the battery assembly 13 is a hollow bearing-supporting post 17. Integral and extending upwardly from the bottom wall of the shell 11 just forwardly of the motor 14 is another hollow bearing-supporting post 18. The posts 17 and 18 are in alignment with each other and are positioned so as to support respective pillow bearings 19 and 20 through which extend the rotating shaft of the motor 14. The post 17 and 18 are round in cross-section and have a hollow interior opening at the tops thereof. Filling the bore or interior of the post 17 is a lubricant-impregnated fibrous material 21. Similarly packed in the bore or interior of the post 18 is a lubricant-impregnated fibrous material 22.

The rearward pillow bearing 19 has a downwardly directed tongue or projection 19A of frusto-conical shape which substantially fills the upper end of the bore or interior of the post 17 and which tongue 19A is in intimate engagement with the material 21 so as to receive lubricant therefrom by a capillary or wicking action. Similarly, the pillow bearing 20 has a downwardly directed tongue or projection 20A of frusto-conical shape which substantially closes the opening to the bore or interior of post 18. The tongue 20A is similarly in intimate engagement with the material 22 so as to receive lubricant therefrom by a capillary or wicking action. The pillow bearings 19 and 20, including their respective tongues 19A and 20A, are formed of a molded porous metal, such as bronze or the like, which permits lubricant to seep therethrough, that is, to be absorbed within the material of the pillow bearing and thus to provide lubrication for the rotating shaft within the bore of the bearing accommodating the shaft.

Thus there is provided a good means for maintaining lubrication of the bearings and at the same time means is provided for preventing rotation of the bearings under the torque force imparted thereon by the rotation of the shaft. A cross-bar or strap 23 extends across the top of bearing 19 and is secured by means of screws 25 to the lower shell 11 and holds the bearing downwardly in position. In view of the means for preventing rotation of the bearing as described, it is not necessary to press down on the top of the bearing with the strap 23 as might otherwise be necessary. It is known that excessive force downwardly on such a bearing upon the supporting post of molded plastic material tends in time to distort and compress the material and thus to cause the bearing to get out of true alignment. However, with the arrangement shown and described, it is not necessary to impart such a strong downward force on the top of the bearing to resist such rotation and thus to obviate distortion of the plastic supporting post. If desired, additional means may be provided on the upper surface of the bearing 19 by making a small flat or longitudinally-extending groove 19B thereon and by providing two small spaced slits 23A in the cross-bar 23 so that the material between the slits 23A snugly engage in the flat or groover. This aids in steadying and holding the upper portion of the bearing 19.

Similarly there is a cross-bar or strap 24 secured by screws 25 to the lower shell 11 extending over the pillow bearing 20 to hold the same in position. Similarly by reason of the anti-rotation means described, less force is required by the strap 24 to hold the bearing in position. Similarly, also, small slits 24A may be provided in the strap 24 to engage in a flat or longitudinally-extending groove 20B in the upper surface of the bearing 20.

Carried by and extending forwardly of the rotating shaft of the motor 24 is a worm gear 26 which is enmeshed with a drive gear 27 located below the worm gear 26. Carried by the drive gear 27 are a pair of eccentrically mounted cams 28 and 29, these cams being positioned 180 degrees apart relative to the axis of the drive gear 27. The drive gear 27 with the cams 28 and 29 carried thereby is journaled on a shaft 30. This shaft 30 is carried on two supporting posts 31 by two straps 32, the straps 32 being held down on the posts by screws 25.

Connected to each cam is a coupling or connecting element. A first coupling element 34 is connected to cam 28 so as to be reciprocated as the cam 28 revolves. A second coupling element 35 is connected to the cam 29 so as to be reciprocated as the cam revolves.

Details of the construction of the coupling elements are better shown in FIGURES 6, 7, 8 and 9 wherein one of the coupling elements 35 is shown separated from the remainder of the driving unit. Coupling elements 34 and 35 are mirror images of each other and are similar in general construction except that they face each other in opposition and have their parts arranged as shown.

The coupling element 35 has a cam-engaging portion 35A which in turn has an elongated aperture 35B for accommodating the cam 29 whereby revolving of the cam 29 causes a reciprocating motion of the coupling element 35. A longitudinal portion 35C extends forwardly and has a recess or socket 35D formed therein, which socket has an open side facing inwardly, that is, toward the opposite coupling element 34 when in assembled arrangement. Near the forward upper end of the longitudinal portion 35C is an elongated slot 35E, the major dimension of which is vertical, that is, at right angles to the axis of the longitudinal portion 35C. This elongated slot 35E accommodates a first locking pin 36 which is moved upwardly and downwardly in the slot 35E.

The first locking pin 36 is carried by a pin-carrying member 38, preferably made of metal and having the shape illustrated in the drawings. The member 38 has a pivot-supporting portion 38A which extends into a small slot 35G provided in the upper portion of the element 35. Adjacent the rearward end of the member 38 there is an angular abutting portion 38B extending at right angles to the major portion of the member 38 and extending as a wing away from the coupling element 35. The arrangement of the pivot-supporting portion 38A in the small slot 35G is such that the member 38 on the pivot support swings between the positions illustrated in FIGURES 7 and 8 and the position illustrated in FIGURE 9. The slot 35G permits any required play in the shifting of the axis of the pivot support 38A. The forward end of the member 38 has the locking pin 36 carried thereby which locking pin extends into the slot 35E. The swinging of the member 38 causes the pin 36 to move upwardly and downwardly in the slot 35E.

A wire spring member 40 has its forward end firmly secured to the pin 36 on the side of the element 35 which is opposite the member 38. The rearward end of the wire spring 40 is bent to form an end portion 40A which end portion 40A is anchored in a hole provided in the element 35. Forwardly of the anchored rear end of the spring 40 there is a hooked boss 35F extending outwardly from the side of the element 35. The disposition of the hooked or overhanging boss 35F is such that the spring 40 may be moved upwardly and under the boss 35F so that the boss 35F provides an abutment resisting further upward swinging of the spring 40. Thus, by the arrangement shown, the locking pin 36 resiliently urged downwardly so as to be biased into the lower portion of the slot 35E. However, this resilient bias may be overcome by the pressing downwardly of the angular abutment portion 38B so as to pivotally swing the member 38 in a direction to raise the pin 36 against the bias of the spring 40.

My driving unit is particularly adapted to reciprocating in opposite directions a pair of adjacent knife blades 44 and 45. The blades 44 and 45 are mirror images of each other and are similar in construction except for having the parts arranged on opposite sides as illustrated. The knife blades have their forward portions broken away so that only the rearward portions thereof are shown in the drawings.

The blade 44 is shown mounted in the coupling element 35. The blade 44 has a tang portion 44A which is insertable in the socket 35D of the coupling element 35. Interconnecting the tang portion 44A and a cutting blade portion 44C is an offset portion 44B. The cutting blade portions of the two blades are disposed closely adjacent to each other so as to reciprocate in sliding engagement therewith. However, the tang portions of the two blades are spaced apart but parallel to each other and this requires the offset portions, such as the angular offset portion 44B. The inner upper edge of the tang portion 44A has a chamfered corner 44D which aids in introducing the tang portion 44A into the socket 35D. Also the chamfered edge portion 44D first engages the locking pin 36 upon insertion of the tang portion into the socket so that by a camming action the locking pin is raised upwardly so as to clear the tang portion and to permit the same to enter the socket 35D. Formed in the upper edge of the tang portion 44A forwardly of the chamfered portion 44D is a notch 44E which is provided for accommodating the locking pin 36. When the pin 36 is in the notch 44E and held downwardly therein by the spring 40, then the tang portion 44A may not be withdrawn longitudinally from the socket 35D. However, upon pressing the angular abutment 38B downwardly, the spring 40 is overcome and the locking pin 36 is raised out of the notch 44E and clears the tang portion 44A and thus permits the blade 44 to be withdrawn from the driving unit.

Formed in the lower portion of the longitudinal portion 35C and protruding inwardly of the socket 35D, there is a small boss 35I which is in the path of the tang portion 44A when moved into the socket 35D. Formed in the wall of the longitudinal portion 35C and extending therethrough is a small slit 35H having the form illustrated. As the plastic material of the element 35 is yieldably resilient, the movement of the tang portion 44A into the socket 35D depresses the small boss 35I which is accommodated by the small slit 35H. This provides a resiliently yieldable force tending to urge the tang portion 44A upwardly at that location and aids in providing a firm grasp upon the tang portion 44A.

The second blade-connecting element 35 similarly engages the blade 45. It also has a wire spring 41 which urges a second locking pin 37 into position to interengage with a corresponding notch in the tang portion 45A of blade 45. The second locking pin 37 is similarly carried by a second pin-carrying member 39 which is actuated by an angular abutting portion 39A moved in a similar manner, as the abutting portion 38A.

The two elements 34 and 35 are reciprocated longitudinally of the housing by the respective cams. The bottom of the shell 11 is provided with parallel guide slideways 11B along which the elements 34 and 35 slidably reciprocate. Positioned over the two reciprocal elements 34 and 35 is a top slideway 43 which is mounted to the lower shell 11 by screws 25. Thus, the elements 34 and 35 are held so that they may only reciprocate in parallel planes longitudinally of the housing.

The elements 34 and 25 are integral molded pieces of plastic material preferably reinforced with glass fibers for strength. Also preferably they are somewhat smooth and impregnated with a suitable lubricating material so as to provide good bearing characteristics where their surfaces engage the rotating cams and where their surfaces slidably engage the upper and lower slideways. Also the coupling elements 34 and 35 may be molded of nylon, Teflon or other such material having good bearing and sliding characteristics.

The blade 44 is provided with a guard 46 and the blade 45 is provided with a corresponding guard 47. The guards 46 and 47 are of a suitable hard plastic and aid in preventing food from moving along the knife blade into the housing and also aid in handling the blades in assembling and disassembling them with the driving unit. The guards may be mounted on the blades by providing two spaced holes through the blades where shown and by unsetting with heat and pressure the plastic material of the blade so as to provide a riveted or pinned overportion holding the guard to the blade. For example, the guard 46 is provided with riveted or pinned over-portions 46A extending through the openings in the blade so as to firmly hold the guard 46 to the blade.

To release the blades 44 and 45 from the respective locking pins 36 and 37, a button 49 is provided which button protrudes outwardly from the housing near the forward upper end thereof. This release button 49 has two side arms 49A and 49B which are positioned over the respective abutting portions 38A and 39A of the two pin-carrying members 38 and 39. Upon the pressing downwardly of the button 49 both the abutment portions 38A and 39A are depressed and this in turn raises the two pins 36 and 37 simultaneously. The longitudinal extent of the bottom surfaces of the side arms 49A and 49B is such that the abutting portions 38A and 39A are always located under the side arms 49A and 49B and thus are in a position to be engaged thereby regardless of the relative positions of the elements 34 and 35 in their reciprocating motions.

My arrangement also includes means for coupling the blade-release mechanism with the switch mechanism. Two switch leaves or reeds 51 and 52 are carried by a post 12B protruding downwardly from the upper shell 12. This post 12B has a lower hooked or angular portion 12C and the rearward end portions of the leaves or reeds 51 and 52 have openings therein through which protrude the hooked or angular portion 12C. A piece of electrical insulation 55 is positioned between the two leaves 51 and 52 at the location of the post 12B. The rearward ends of the leaves 51 and 52 are electrically connected in the usual way to wires 53 and 54, respectively, which wires in turn are in the electrical circuit of the driving unit. The leaves 51 and 52 are of good electrical conducting material and also have spring-like characteristics so as to provide resiliently movable forward ends in the manner of leaf springs. The upper leaf or reed 51 has a downwardly directed contact 51A and the lower leaf or reed 52 has an upwardly directed contact 52A, the contacts 51A and 52A being in opposition so as to be in electrical engagement upon the leaves 51 and 52 being moved toward each other and thus to provide an electrical circuit through the contacts 51A and 52A.

Slidably mounted on the upper shell 12 is a slide switch button 50 which may be moved forwardly to "on" position and rearwardly of "off" position with the thumb or finger of the operator. The slide button 50 has guiding and securing portions 50A which fit under the slideway along opposing shoulders formed in the shell 12. There is a boss 50B extending downwardly from the button 50 near the forward end thereof. This boss 50B is directed to slide along the upper surfaces of leaf 51 as the forward end portion of the leaf 51 is bent or tilted upwardly at an incline. Forward movement of the button 50 to the position illustrated causes the boss 50B sliding forwardly to depress by a camming action the upper leaf 51. Rearward movement of the button 50 away from the forward end of the leaf 51 permits the leaf 51 to move upwardly by reason of its resilient action. Thus interengagement may be completed between the contacts 51A and 52A by the longitudinal sliding action of the button 50. The up-turned forward portion of leaf 51 also by resilient action of the leaf causes a rearward camming action against boss 50B, resulting in button 50 being returned to "off" position when manually released from the forward position shown.

The lower leaf 52 also of a resilient or spring-like material extends forwardly under the button 49 and within the crotch formed by the branching of the portions 49A and 49B. Downward pressing of the button 49 depresses the lower leaf 52 and thus moves the contact 52A downwardly away from a location where it could be contacted by the upper contact 51A. Thus with the lower leaf 52 depressed to its location shown in dotted lines in FIGURE 2, it is not possible for the sliding button 50 to cause interconnection of contacts 51A and 52A and thus to complete closing of the circuit. Thus, actuation of the lower leaf 52 by the button 49 is a safety switch which is auxiliary to or in addition to the manual sliding switch 50. Therefore, it is to be seen that the blades 44 and 45 may not be released by the locking pins 36 and 37 unless the button 49 is depressed, which simultaneously moves the switching elements to a position where an electrical circuit may not be completed and the switch may not be closed. This provides a safety feature and thus prevents the blades from being removed while the motor is energized or while the motor could be energized by reason of the slide button 50 being left in a forward position. The button 49 is resiliently urged upwardly by the lower leaf 52 and thus the button 49 must be manually held downwardly while the locking pins are being disengaged and this simultaneously breaks the electrical circuit of the drive unit and prevents the motor from being turned on inadvertently by forward positioning of the sliding button 50.

My invention also includes a novel method of mounting the contacts to the batteries of the assembly 13. The batteries of the assembly 13 are of the rechargeable type whereby upon the unit being placed in a charging unit with the batteries being properly electrically connected with the charging unit, the batteries may be periodically recharged as required. In the illustration, the assembly 13 consists of batteries 57, 58, 59 and 60 held together by a band 61. The batteries are interconnected in series and the batteries in turn are electrically connected to the motor 14. Instead of having separate spring contact elements carried by the housing, I mount a first spring contact arm 62 to battery 57 at the base thereof and a second spring contact arm 63 to the battery 59 at the post thereof. The contact arms 62 and 63 are of resilient leaf spring material and are also electrically conductive. One end of each contact arm 62 and 63 is welded or otherwise mechanically and electrically bonded to the metal end of the battery upon which it is mounted, arm 62 being mounted to battery 57 and arm 63 being mounted to battery 59.

The lower shell 11 has an end wall 11C projecting upwardly at the end to close the end of the housing. Extending through this end wall 11C are two spaced openings 56A and 56B, which expose the arms 62 and 63 to contacts protruding upwardly from a charging unit (not shown). The lowermost ends of the arms 62 and 63 are accommodated in recesses 56C and 56D, respectively, so that the arms 62 and 63 are confined within the housing and may not move outwardly therefrom. As seen in the drawing, each arm 62 and 63 is engageable by a protruding contact or stud element of an electrical charging unit. By the arrangement shown, it is not necessary to have brackets and other such devices mounted to the housing for carrying the contact arms and it is also not necessary to have the contact arms interconnected with wiring and the like to the batteries. The arrangement provides a good mechanical mounting with a minimum of parts for the contact arms and also assures a good electrical interengagement for electrically connecting the batteries with a charging unit.

A unique and highly useful driving unit is provided by the above described and illustrated structure. Also the several structural features above shown and described in themselves have a marked utility and provide improved results over comparable structures.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. In an electric appliance having at least two rechargeable batteries mounted in the housing thereof for powering an electric motor in the appliance, said housing having a base wall of electrical insulating material, said batteries being electrically connected in series with each other and said motor, each of said batteries having a metallic base at the end thereof in electrical circuit with said batteries, the improvement of a pair of elongated electrical contact arms, one of said arms adjacent an end thereof being bonded to the base of one of said batteries at a first location and having a free end extending away from the plane of the base of said one battery toward the base wall of the housing, a second of said arms adjacent an end thereof being bonded to the base of another of said batteries at a second location and having a free end extending away from the plane of the base of said another battery toward the base wall of the housing, the base wall of said housing having a pair of spaced openings extending therethrough, one of said openings exposing a side of one of said arms at a distance therealong from said first location, the resiliency of said arms urging said arms toward said base wall for exposure through said openings, said base wall being formed to provide a pocket for the free end of each of said arms to limit movement thereof relative to said base wall, said exposed arms being disposed to be contacted by terminal prongs of a battery charging unit extending into said openings.

2. The improvement claimed in claim 1 and in which these are at least four said batteries arranged in side by side parallel relationship, and in which said arms are bonded to the bases of a first pair of two side-by-side said batteries and the free ends thereof extend over but spaced from the bases of a second pair of two side-by-side said batteries adjacent said first pair of batteries, and in which the pocket for said free ends holds the arms out of contact with the bases of the batteries of said second pair of batteries.

3. In an electric appliance having a pair of rechargeable batteries mounted in the housing thereof, the housing having a base portion of electrical insulating material adapted to be accommodated in a battery recharging unit having a pair of contact prongs extending therefrom for electrical connection with said batteries for energization of the same, a pair of elongated electrical contact arms each adjacent an end thereof, respectively, being bonded directly to the metal base terminal of a different one of said batteries to be supported by the battery and in electrical contact therewith, said arms being bent to extend both laterally of, and axially away from, the respective batteries, the free ends of the arms, respectively, being displaced away from the planes of the said base terminals of the respective batteries toward the base portion of the housing, and being resiliently swingable on the support provided by said batteries, said base portion of the housing having open spaces to expose at spaced locations the said arms near the free ends thereof to permit said contact prongs to extend into said open spaces for electrically engaging the respective arms, pocket means carried by said base portion for accommodating said free ends of the respective arms to limit movement thereof.

4. In an electric appliance having a pair of rechargeable batteries mounted in the housing thereof, the housing having a base portion of electrical insulating material adapted to be accommoadted in a battery recharging unit having a pair of contact prongs extending therefrom for electrical connections with said batteries for energization of the same, a pair of elongated electrical contact arms each adjacent an end thereof, respectively, being bonded directly to the metal base terminal of a different one of said batteries to be supported by the battery and in electrical contact therewith, said arms being inclined away from the planes of the base terminals of the respective batteries to present free ends protruding from the batteries and supported in position thereby, said free ends each having a contact area disposed to be contacted from a position rearwardly of the housing base portion, the housing base portion being open opposite said contact areas to expose the contact areas at spaced locations to permit said contact prongs to extend into the housing base portion for electrically engaging the respective arms.

References Cited

UNITED STATES PATENTS

| 3,264,545 | 8/1966 | Kott | 320—2 X |
| 3,348,116 | 10/1967 | Freeman et al. | 320—2 |
| 3,370,214 | 2/1968 | Aymar | 320—2 |

W. M. SHOOP, Jr., Primary Examiner

STANLEY WEINBERG, Assistant Examiner

U.S. Cl. X.R.

320—14